Patented Mar. 17, 1953

2,632,004

UNITED STATES PATENT OFFICE 2,632,004

RESIN AZO DYE

Louis M. Minsk and Jonas John Chechak, Rochester, N. Y., assignors to Eastman Kodak Company, Rochester, N. Y., a corporation of New Jersey No Drawing. Application September 29, 1949, Serial No. 118,706

11 Claims. (Cl. 260—152)

This invention relates to new non-diffusible dyes and a method for preparing such dyes.

While many dyes possess properties which would suggest that these dyes might be expected to be especially useful for many purposes, it has been found that for certain purposes these dyes cannot be used because of their tendency to wander or diffuse from the surface or medium in which they have been incorporated. As an example, some dyes possess such valuable characteristics as good absorption, bleachability, etc. when incorporated in a photographic emulsion layer, however, they cannot be used due to their tendency to wander from the layer in which they have been incorporated to a different layer where their presence produces undesirable, harmful effects. If such a dye could be treated in such a manner that it would retain its valuable photographic properties, while acquiring the property of non-diffusibility, it could be used for purposes for which the untreated dye was not suitable.

Non-diffusible azo dyes have previously been prepared by nitrating a copolymer of styrene and maleic anhydride, reducing the nitro groups of the reaction product to amino groups and then diazotizing these amino groups and coupling in the usual manner. (Kenyon et al. U. S. Patent 2,274,551, dated February 24, 1942.)

It has also been proposed to render certain dyes containing phenolic hydroxyl groups less susceptible to diffusion by reacting these dyes with such resinous materials as polyacrylyl halides. However, this reaction proceeds so slowly that, in many instances, no reaction can be detected, or the amount of reaction is virtually negligible. Also, where the hydroxyl group is a part of the auxochromophoric, or color producing, system of the dye, esterification thereof can, in some instances, further impair the desirable color characteristics, or photographic properties, of the dye. Since the resin portion of the molecule under the most favorable conditions acts as a diluent, serving to lower the tinctorial strength of the reacted dye, it is most important to have as high a degree of reaction as practical and to alter the color characteristics of the dye as little as possible.

We have now found new dyes which are non-diffusible and a new method for preparing such dyes. These new dyes are obtained according to our invention by reacting triphenylmethane dyes, azo dyes, anthraquinone, or other dyes such as those hereinafter set forth which contain a hydroxyalkyl group selected from the group consisting of C-hydroxyalkyl and N-hydroxyalkyl groups, with a synthetic polymer containing carboxylic halide, carboxylic anhydride or like acid-reacting units which can esterify the hydroxyl group of the hydroxyalkyl group of the dye. Contrasted with those dyes prepared by reacting an original dye containing a phenolic hydroxyl group with a polyacrylyl halide, the color characteristics of the dyes of our invention have not been impaired, their diffusibility is low or absent, and the amount of reaction between the original dyes and vinyl resins containing acid groups is substantially higher. In those original dyes containing both a phenolic hydroxyl and a hydroxyalkyl group, we have found that esterification selectively occurs at the hydroxyl group of the hydroxyalkyl group. The dyes of our invention have been especially useful in that they retain many of the color properties of the original dye, such as absorption characteristics, photographic properties (such as bleachability or inertness), etc.

It is, therefore, an object of our invention to provide new non-diffusible dyes. A further object is to provide a new process for preparing these dyes. Other objects will become apparent from a consideration of the following description and examples.

According to our invention we prepare our new non-diffusible dyes by reacting anthraquinone, triphenylmethane, azo, etc. dyes containing a C-hydroxyalkyl and/or N-hydroxyalkyl group with a synthetic polymer containing carboxylic halide, carboxylic anhydride, or like reacting groups.

As acid-reacting resins we can use synthetic polymers containing carboxylic halide (e. g. chlorides, bromides, etc.) and/or carboxylic anhydride groups. Such polymers include the interpolymers of maleic anhydride, e. g. interpolymers of maleic anhydride with styrene, vinyl acetate, vinyl chloride, alkyl vinyl ethers (e. g. ethyl vinyl ether), acrylic acid, α-methacrylic acid, etc., as well as the corresponding polymers of maleyl and fumaryl halides (e. g. chlorides, bromides, etc.) with these vinyl compounds; polyacrylyl halides, e. g. polyacrylyl chloride, poly α-methacrylyl chloride, etc.; polyacrylic anhydrides, e. g. polyacrylic anhydride, poly α-methacrylic anhydride, etc.; etc. The synthetic polymers of our invention are obtained from a polymerizable, unsaturated compound containing a $CH_2=C<$ group, as can be seen from the resins listed above. Useful interpolymers of maleic anhydride, substituted maleic anhydrides (e. g. citraconic anhydride, phenylmaleic anhydride, etc.); fumaryl halides, maleyl halides with vinyl compounds are described in Voss and Fikentscher U. S. Patent 2,047,398, dated July 14, 1936. Useful polymers of acrylic halides (i. e. acrylic halides and α-methacrylic halides) are described in Mark and Fikentscher U. S. Patent 1,984,417, dated December 18, 1934. Such polymers include, for example, polyacrylyl chloride, poly α-methacrylyl chloride, etc. as well as copolymers of these halides with a vinyl compound, such as vinyl acetate, styrene, ethyl acrylate, acrylonitrile, etc.

As azo dyes containing C-hydroxyalkyl or N-hydroxyalkyl groups, we employ dyes wherein at least one (e. g. 1–3) such hydroxyalkyl group is located in a position other than the position ortho to the azo group. Azo dyes which contain only one C-hydroxyalkyl or N-hydroxyalkyl group and that in a position ortho to the azo group are not suitable in our invention, we have found. Azo dyes which contain C-hydroxyalkyl or N-hydroxyalkyl groups in positions other than the position ortho to the azo group, or which contain C-hydroxyalkyl or N-hydroxyalkyl groups in positions other than ortho to the azo group and in addition contain a hydroxyalkyl group in the position ortho to the azo group, can advantageously be used in our invention.

Azo dyes which can advantageously be used in our invention include those represented by the following general formula:

$$R-N=N-R_1$$

wherein R represents an aryl group, e. g. phenyl, o-, m- and p-chlorophenyl, o-, m- and p-nitrophenyl, o-, m- and p-tolyl, o- and p-acetophenyl, o-, m- and p-cyanophenyl, o- and p-phenylazophenyl, o-, m- and p-carboxyphenyl, o-, m- and p-sulfophenyl, o-, m- and p-carboxymethylphenyl, o-, m- and p-hydroxymethylphenyl, o-, m- and p-hydroxyphenyl, o-, m- and p-alkoxy (e. g. methoxy, ethoxy, etc.), phenyl, o-, and p-diphenyl, o- and p-aminophenyl, o- and p-acetaminophenyl, o- and p-[N-alkyl (e. g. methyl, ethyl, etc.) amino]phenyl, o- and p-[N,N-dialkyl (e. g. dimethyl, diethyl, ethyl methyl, etc.) amino]phenyl, etc. groups (i. e. a monocyclic aryl group of the benzene series), a naphthyl group (e. g. α-naphthyl, β-naphthyl, etc. groups, unsubstituted or substituted by such groups as chloro, nitro, hydroxy, alkoxy (e. g. methoxy), alkyl (e. g. methyl, ethyl, etc.), amino, etc. groups), an indandionyl group (e. g. 2-(1,3-indandionyl), etc. groups), or has the values set forth for $R_1$ below, and $R_1$ represents an aryl group containing a C-hydroxyalkyl (e. g. methylol, β-hydroxyethyl, etc.) or N-hydroxyalkyl (e. g. β-hydroxyethylamino, di-(β-hydroxyethyl) amino, γ-hydroxypropylamino, di-(γ-hydroxypropyl)amino, β-hydroxypropylamino, di-(β-hydroxypropyl)amino, β-hydroxyisopropylamino, di-(β-hydroxyisopropyl)amino, N-alkyl (e. g. methyl, ethyl, etc.) N-(β-hydroxyethyl) amino, etc.) group in at least one (e. g. 1–3) position other than the position ortho to the amino group, e. g. p-[N-(β-hydroxyethyl)amino]phenyl, p-[N,N-di-(β-hydroxyethyl)amino]phenyl, p - [N-(β-hydroxyethyl)-n-methylamino]phenyl, p-[N-ethyl-N-(β-hydroxyethyl) amino]phenyl, 7 - [N-(β-hydroxyethyl) amino]-β-naphthyl, 3-hydroxymethylphenyl, 4-hydroxymethylphenyl, 2,4-dihydroxymethylphenyl, 4-hydroxymethyl-β-naphthyl, etc. groups. Typical azo dyes include those represented by the following formulas:

*Azobenzene type*

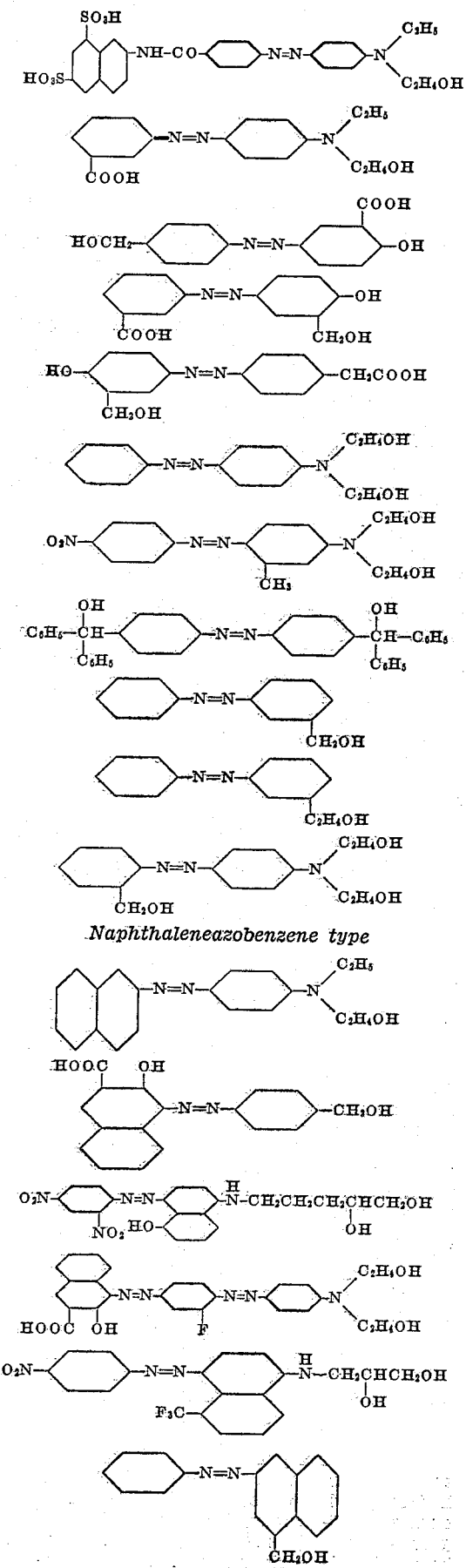

*Naphthaleneazobenzene type*

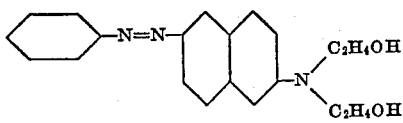

*Stilbene-phenylazo type*

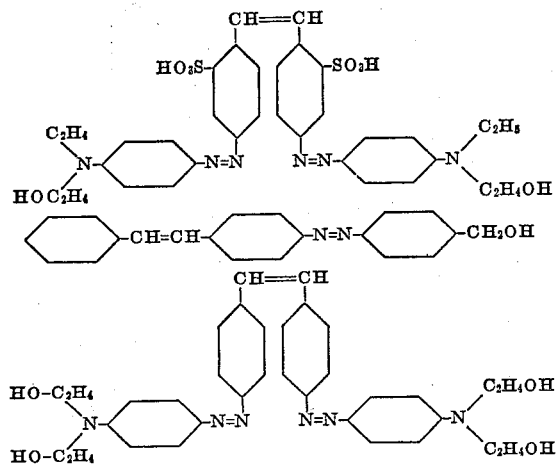

*Indandionyl type*

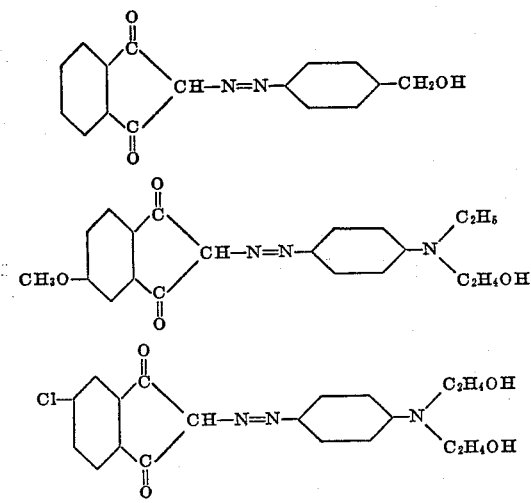

Other azo dyes containing a N-hydroxyalkyl or C-hydroxyalkyl group can advantageously be employed in our invention. A number of such dyes are described in one or more of the following United States patents: 2,286,795, dated June 16, 1942; 2,289,349, dated July 14, 1942; 2,289,376, dated July 14, 1942; 2,311,033, dated February 16, 1943; 2,317,365, dated April 27, 1943; 2,336,275, dated December 7, 1943; 2,346,013, dated April 4, 1944; 2,391,179, dated December 18, 1945; and 2,432,393, dated December 9, 1947. These azo dyes can be obtained by the usual azo coupling reaction, such as is illustrated in the following examples:

*Example A*

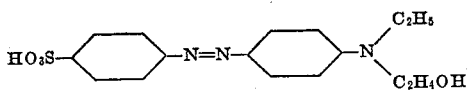

19 g. of sulfanilic acid and 7 g. of sodium nitrite were dissolved in succession in 100 cc. of water, to which 20 cc. of a 20 per cent sodium hydroxide solution had been added. The resulting solution was cooled to −5° C. and poured with stirring into a solution of 100 cc. of water and 17 cc. of concentrated sulfuric acid, which had also been cooled to −5° C. During the mixing of the two solutions the temperature of the reaction mixture was not allowed to rise above 5° C. The excess sodium nitrite was removed by adding sulfamic acid.

16.6 g. of N-ethyl-N-(β-hydroxyethyl)aniline were dissolved in a solution of 10 cc. concentrated hydrochloric acid in 100 cc. of water. This solution was then added to the above diazo solution, and 10 g. of sodium acetate were added, while the solution was stirred for one hour. After standing overnight, 10 cc. of hydrochloric acid were added and the mixture filtered. The filter cake was washed with 600 cc. of water and then stirred in 300 cc. of hot water containing 4 g. of sodium carbonate and 4 g. of activated carbon (Norite), stirred for 15 minutes while hot, and filtered. The filtrate was acidified with acetic acid and cooled. The product was filtered off and dried on a steam bath. It was then extracted with 400 cc. of a solution of 95 per cent ethanol (5 per cent methanol) at room temperature and the alcoholic extract filtered. The filtrate was evaporated to 150 cc., cooled to 0° C. and the recrystallized dye filtered off. The filter cake was dispersed in 200 cc. of acetone and filtered, allowing no air to be drawn through the final filter cake. The product was dried in a vacuum over calcium chloride. The yield amount to 6 g.

*Example B*

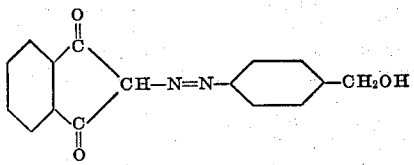

8.0 g. of p-aminobenzyl alcohol were stirred in a solution of 20 cc. of concentrated hydrochloric acid in 100 cc. of water, and the solution was cooled to 0° C. There were then added 4.6 g. of sodium nitrite dissolved in 50 cc. of water, while the temperature of the resulting mixture was not allowed to go above 5° C. The cold solution was stirred for 30 minutes and the excess sodium nitrite was destroyed with sulfamic acid. This solution was added with stirring to a suspension of 9.8 g. of 1,3-indandione in 100 cc. of water, which had been cooled to 0° C. 100 cc. of pyridine were added and the solution allowed to warm with stirring over a period of 30 minutes. The solution was made acid to Congo Red with concentrated hydrochloric acid, while the solution was maintained at 20° C. The mixture was filtered with suction and the precipitated product washed with 100 cc. of water and dried. The filter cake was stirred into 2500 cc. of hot methanol for 20 minutes and filtered hot. The hot filtrate was quickly concentrated to 500 cc. under reduced pressure, chilled and again filtered. The filter cake was dried to give 4 g. of the desired product.

The p-aminobenzyl alcohol used in the above example was obtained as follows:

50 g. of calcium chloride were dissolved in 1800 cc. of hot water. While stirring, 400 g. of zinc dust were added and the mixture boiled. 100 g. of p-nitrobenzyl alcohol were added in small portions over a period of 15 minutes. Stirring and heating were continued 30 minutes and the mixture filtered while hot. The filtrate was chilled and filtered cold. To this filtrate 50 g. of sodium carbonate were added and the calcium carbonate formed filtered off. The filtrate was concentrated under reduced pressure to 500 cc. and filtered. The filtrate was extracted with two 300 cc. portions of ether, and the combined extracts heated to remove all of the ether. The residue was stirred in 200 cc. of benzene, chilled and filtered. The product was dried to give 18 g. of p-aminobenzyl alcohol.

*Example C*

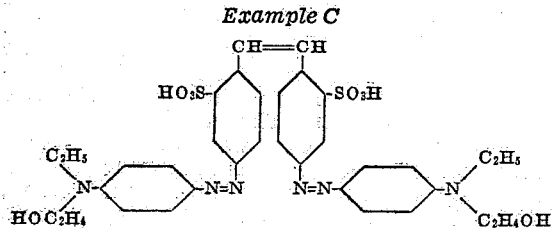

3.8 g. of sodium nitrite were dissolved in 20 cc. of water, and this solution was added to a solution of 10 g. of 4,4'-diamino-2,2'-disulfostilbene in 100 cc. of water and 20 cc. of 10 per cent sodium hydroxide. After cooling to 10° C., a solution of 20 cc. of concentrated hydrochloric acid in 60 cc. of water was added, keeping the temperature below 10° C.

9.7 g. of N-ethyl-N-(β-hydroxyethyl) aniline were dissolved in a solution of 15 cc. of acetic acid in 200 cc. of water with heating. The solution was cooled to 10° C. and 40 g. of sodium acetate stirred in. To this solution the above diazo solution was added, the temperature being kept at 10° C. After stirring the reaction mixture for one hour, it was allowed to stand for an additional four hours. To the reaction mixture 3 g. of sodium carbonate were added and the volume was brought up to 900 cc. with hot water. While stirring, 100 g. of sodium acetate were added over a period of 30 minutes and the reaction mixture allowed to cool. The dye was filtered off and the wet cake extracted with 1500 cc. of acetone, filtered and dried. After drying, 23 g. of product were obtained.

By replacing the diazotized sulfanilic acid in Example A with a molecularly equivalent amount of diazotized β-naphthyl amine, the dye represented by the formula:

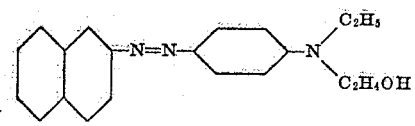

was obtained in good yield.

Other azo dyes selected from those represented by the formulas listed under dye types above can be prepared by coupling a diazotized compound with a suitable coupling component. The above examples are merely illustrative of advantageous methods of preparing such dyes.

Anthraquinone dyes containing at least one C-hydroxyalkyl or N-hydroxyalkyl group (e. g. 1–3) which can advantageously be used in practicing our invention include those represented by the following general formula:

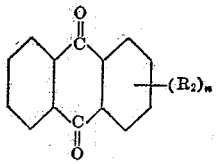

wherein $n$ represents a positive integer from 1 to 3 and $R_2$ represents a C- or N-hydroxyalkyl group, e. g. methylol, β-hydroxyethyl, β-hydroxyethylamino, di-(β-hydroxyethyl)amino, N-ethyl- N-(β-hydroxyethyl)amino, N-(β-hydroxyethyl)-N-methylamino, etc. groups. Useful anthraquinone dyes include those represented by the following formulas:

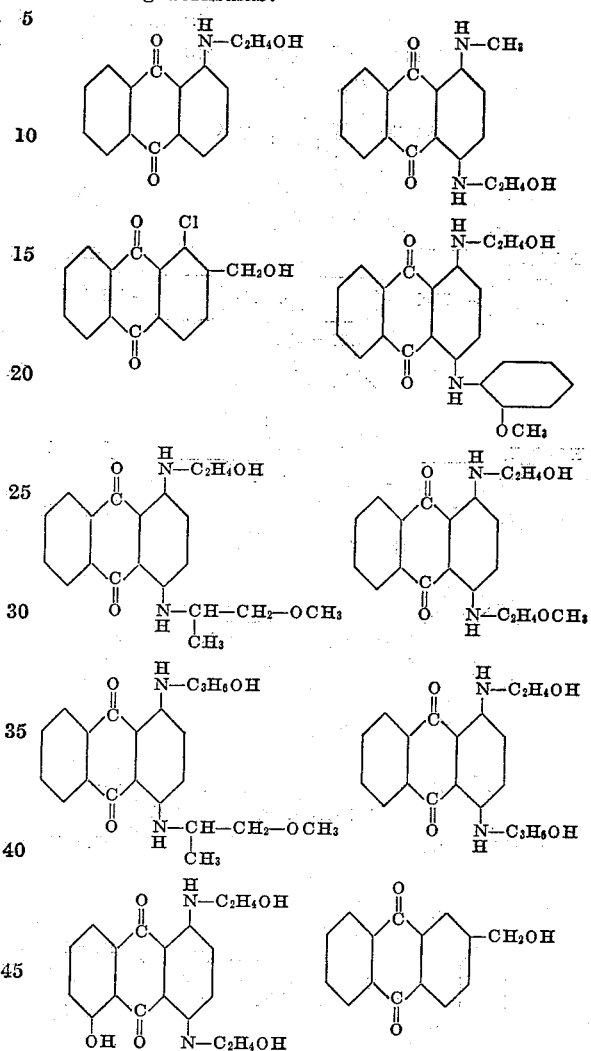

Other anthraquinone dyes containing C- or N-hydroxyalkyl groups can also be used in practicing our invention. While our invention is concerned with condensations of C- or N-hydroxyalkyl anthraquinone, triphenylmethane, azo, etc. dyes with vinyl resins containing carboxylic halide or anhydride groups, anthraquinone, azo, etc. dyes containing S- or O-hydroxyalkyl groups can also be rendered non-diffusible according to the method herein described.

Also useful for the purpose of our invention are the triphenylmethane dyes containing a C-hydroxyalkyl or N-hydroxyalkyl group in at least one of the positions other than the position ortho to the point of attachment of the phenyl group to carbon atom of the methane group thereof.

The following example illustrates the method of preparing one of the triphenylmethane dyes from which resin-dyes of our invention can be prepared.

*Example D*

A mixture of 33 g. (2 mols.) of N-ethyl-N-β-hydroxyethylaniline, 11 g. (1 mol.) of benzaldehyde, 50 cc. of concentrated hydrochloric acid and 50 cc. of water was refluxed for 16 hours. The brown reaction mixture was poured into 1500 cc. of cold water and the solution made alkaline with sodium carbonate. The sticky precipitate was washed by decantation with water, dissolved in 400 cc. of water to which 50 cc. of concentrated hydrochloric acid had been added and the solution filtered.

The above solution was chilled to 0° C. in an ice bath and a paste of 25 g. of lead peroxide in 50 cc. of cold water was added en masse with vigorous stirring. The green reaction mixture was stirred at 0°–5° C. for two hours and a solution of 30 g. of sodium sulfate in 200 cc. of water was added. After stirring 30 minutes longer, the precipitated lead sulfate was filtered off and the filtrate made alkaline with sodium carbonate. The sticky precipitate was washed on the filter with water and dried. A yield of 21 g. of a green amorphous product represented by the formula:

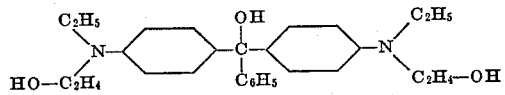

was obtained.

This product was suspended in 600 cc. of hot water, 10 g. of oxalic acid added and the solution boiled for 10 minutes with stirring. The solution was filtered and the desired dye salted out by addition of a solution of 50 g. of ammonium oxalate in 300 cc. of hot water. After chilling, the precipitate was collected on a filter, washed with 100 cc. of water, and the sticky, blue product dissolved in 200 cc. of hot methyl alcohol. The solution was then filtered and evaporated to dryness. A yield of 6.1 g. of green powder represented by the following formula:

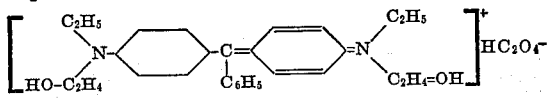

was obtained. A 1:20,000 solution of the dye in ethyl alcohol gave a density measurement of 1.05 at an absorption maximum of 628 mu.

Other triphenylmethane dyes useful in practicing our invention can be prepared in the manner indicated above.

It is to be understood that our invention resides not in the type of dye from which the resin-dyes can be obtained, but in the discovery that dyes containing hydroxyalkyl groups can be reacted with synthetic polymers containing reactive aid groups and thereby be rendered substantially non-diffusible, without materially altering the color characteristics of the original dyes. In addition to the exemplary azo, anthraquinone, and triphenylmethane dyes illustrated above, other types of dyes containing hydroxyalkyl groups which can be used include those of the indigoid dye series, those of the acridine dye series, those of the benzanthrone dye series, those of the phenanthrene dye series, those of the quinhydrone dye series, those of the thioindigoid dye series, those of the phthalein dye series, etc.

The condensation of the above-described triphenylmethane, anthraquinone, azo, indigoid, acridine, benzanthrone, phenanthrene, quinhydrone, thioindigoid, phthalein, etc. dyes with the synthetic polymers containing carboxylic halide and/or anhydride groups are advantageously effected in the presence of acid-binding agents, e. g. tertiary amines, such as the trialkylamines (e. g. triethylamine, tri-n-butylamine, etc.), N,N-dialkylanilines (e. g. N,N-dimethylaniline, N,N - diethylaniline, etc.), N - alkylpiperidines (e. g. N - methylpiperidine, N - ethylpiperidine, etc.), pyridine, quinoline, isoquinoline, etc. These acid-binding agents provide a convenient reaction medium in which the condensations can be carried out. Inert solvents, e. g. aliphatic and aromatic hydrocarbons, e. g. n-hexane, n-heptane, benzene, toulene, the xylenes, etc., high boiling ethers, e. g. 1,4-dioxane, n-amyl ether, etc., ketones, e. g. acetone, butyl ethly ketone, etc. can be employed to advantage.

Heat accelerates the condensations and temperatures varying from 40° C. to the reflux temperature of the reaction mixture have been found to be most effective. The reaction can be carried out under superatmospheric pressures where higher temperatures are desired, as might occur where solvent or acid-binding agent tends to boil off at the temperature sought to be used. The ratio of the triphenylmethane, anthraquinone, azo, indigoid, acridine, benzanthrone, phenanthrene, quinhydrone, thioindigoid phthalein, etc., dyes to the synthetic polymer containing carboxylic halide and/or anhydride groups will, of course, vary, depending on the tinctorial strength desired, the particular dye and vinyl resin employed, presence or absence of solvent, temperature, etc.

The following examples will serve to illustrate more fully the manner whereby we practice our invention.

*Example 1*

9 g. of the dye represented by the following formula:

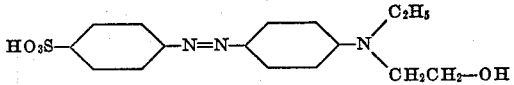

were placed in a three-necked flask, equipped with a stirrer, reflux condenser and a dropping funnel, which contained 50 cc. of dry pyridine. There were then added 26 g. of a 10 per cent solution of polyacrylyl chloride in dry acetone. After all the polyacrylyl chloride solution had been added, the reaction mixture was heated to reflux on a steam bath for 16 hours. The mixture was cooled and sufficient water then was added to redissolve the viscous layer, which had separated on the bottom of the flask, and to convert any unreacted acid chloride groups to carboxyl groups. The solution then was poured into 1.5 l. of acetone with stirring, whereupon a gummy mass precipitated. The precipitate was extracted with fresh portions of acetone until the extracts were only slightly colored. The resin dye, which was insoluble in acetone, was removed and redissolved in about 500 cc. of distilled water. The solution was made acid to Congo Red with hydrochloric acid, and the resin dye, which was obtained as a soft, dark mass, was cut to pieces, extracted with distilled water and then dried at 55° C. The dried product weighed 3.5 g. and was in the form of an almost-black, brittle mass. It was readily dispersible in water in the form of its sodium salt and was also compatible in the form of its sodium salt with gelatin.

0.45 g. of the sodium salt of the resin dye prepared above was added to 200 cc. of a 6 per cent gelatin solution and then coated on a glass plate as a filter layer. A control coating was made with 0.20 g. of the original azo dye in the same amount of gelatin. Both coatings gave clear films of good spectral absorption, the optical density being approximately the same in both cases. Both coatings were rapidly and completely bleached by sodium hydrosulfite. When both of the coatings or layers were coated over with a fast orthochromatic emulsion, the emulsion coated over the filter layer containing the original azo dye lost nearly half of its sensitivity to blue light due to diffusion of the original azo dye up into the emulsion layer. The emulsion layer coated over the filter layer containing the resinous azo dye, on the other hand, retained its sensitivity, being substantially identical to that of the same orthochromatic emulsion coated on a plain support.

Example 2

In an outfit such as that described in Example 1, 6 g. of the dye represented by the following formula:

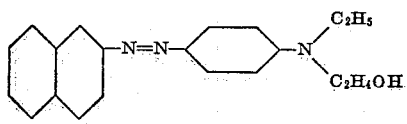

were added to 100 cc. of dry pyridine. The mixture was stirred until solution was obtained, and 450 g. of a 10 per cent solution of polyacrylyl chloride in acetone were added dropwise with stirring. The reaction mixture was then heated on a steam bath for 16 hours, and after cooling, 20 cc. of distilled water were added. The heating was continued for an additional 30 minutes, and the reaction mixture was poured into one liter of distilled water, and the yellow opaque suspension obtained was made strongly acid to Congo red with concentrated hydrochloric acid. The resulting brownish precipitate was filtered by gravity onto filter paper and washed with distilled water until the filtrate was free from color and gave a negative test for chloride ions. After washing the precipitate was orange in appearance. It was then suspended in 500 cc. of distilled water and made basic with a 10 per cent sodium hydroxide solution. After stirring the solution mechanically for about 15 minutes, it was filtered onto a Buchner funnel through filter paper overlaid with a layer of kieselguhr. The clear orange filtrate was made acid to Congo red with concentrated hydrochloric acid. The flocculent precipitate obtained was isolated by centrifuging, and then washed with distilled water. The product was dried at 55° C. in an open dish. Whereas the original, unreacted dye had practically no solubility either in water or a dilute sodium hydroxide solution, the final product was soluble in the latter solution.

Example 3

3.0 g. of the dye represented by the formula in Example 1 were dispersed with stirring in 100 cc. of dry pyridine in an outfit such as that described in that example. There were then added 3.0 g. of polymethacrylic anhydride, and the reaction mixture was heated at 100° C. for 18 hours. The polymer dye was precipitated in ether using about one to one and a half liters of ether for each gram of dye in the original reaction mixture. The resin dye was then extracted with fresh ether four times, using 250–500 cc. per gram of dye originally used. Each change of ether was allowed to extract for one-half an hour, and each change of ether was filtered upon a Buchner funnel. After drying the product in a vacuum desiccator over calcium chloride under a constant water pump vacuum, a yield of 5.5 g. of resin dye was obtained.

Example 4

The resin dye of Example 3 was converted to its acid form as follows:

The resin dye of Example 3, which contained unreacted acid anhydride units, was dispersed in water and a small amount of aqueous sodium hydroxide added to effect solution. The solution was then made acid to Congo red with concentrated hydrochloric acid. This caused the anhydride units to be hydrolyzed to acid units, and the acid form of the dye precipitated. The reaction mixture was then centrifuged, the solid product suspended in 200 cc. of distilled water and the suspension centrifuged. This operation was repeated several times and any tendency for the suspension to go to a colloidal suspension was prevented by adding sodium chloride. The extractions were repeated until the supernatant liquid was no longer acid to Congo red, or until it was chloride-free if no salt had to be added. The resinous acid dye was then dried in a desiccator as described above.

Example 5

3.0 g. of the dye represented by the following formula:

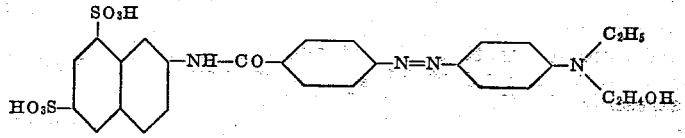

were suspended in 200 cc. of dry pyridine and reacted with 6.0 g. of powdered polymethacrylic anhydride at 100° C. for 18 hours. The polymer dye was recovered as described in Example 3 above, 7.5 g. of purified product being obtained.

Example 6

The polymer dye obtained in Example 5 above was then dissolved in water as described in Example 4 and the unreacted acid anhydride units hydrolyzed to their free-acid form as described in that example (Example 4). The polymeric acid dye thus obtained was then dried in a desiccator.

Example 7

3.0 g. of the dye represented by the formula in Example 1 above were suspended in 100 cc. of dry pyridine and reacted at 100° C. for 18 hours with 4.0 g. of a styrene-maleic anhydride (1:1 mol ratio) interpolymer, which had been ground to a fine mesh powder, in accordance with the method described in Example 3 above. After purifying the polymer dye as described in that example (Example 3), a yield of 7.5 g. of polymer dye was obtained.

Example 8

The polymer dye obtained in Example 7 above was then dissolved in water as described in Example 4 and the unreacted acid anhydride units hydrolyzed to their free-acid form as described in Example 4. The polymer acid dye thus obtained was then dried in a desiccator.

Example 9

2.0 g. of the dye represented by the formula in Example 1 above were suspended in 200 cc. of dry

Example 10

2.0 g. of the dye represented by the following formula:

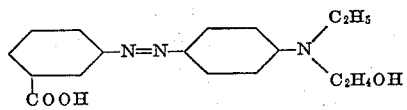

were suspended in 200 cc. of dry pyridine and refluxed for 18 hours with 6.0 g. of finely divided polymethacrylic anhydride. After processing the polymeric product in the manner described in Example 3 above, there were obtained 6.0 g. of polymer dye, which could be hydrolyzed to a polymeric acid dye by the process described in Example 4 above.

Example 11

2.0 g. of the dye represented by the following formula:

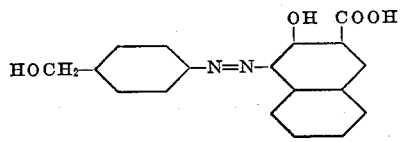

were suspended in 200 cc. of dry pyridine and then refluxed with 6.0 g. of fine-mesh polymethacrylic anhydride for a period of 18 hours. The reaction mixture was then processed by the method described in Example 3 above, 5.5 g. of purified resin dye being obtained. This resin dye can be hydrolyzed in an acid resin dye by the process described in Example 4 above.

Example 12

2.0 g. of the dye represented by the formula in Example 5 above were dissolved with heating in 200 cc. of dry pyridine, and 6.0 g. of a styrene-maleic anhydride (1:1 mol ratio) interpolymer were added. The mixture was then heated at 100° C. for 35 minutes, at the end of which time 250 cc. of distilled water were added to the now gelatinous mass. The mixture was then stirred until a clear, brown solution was formed, and the reaction product was recovered as described in Example 3 above.

Example 13

2.0 g. of the dye represented by the formula in Example 10 above were suspended in 200 cc. of dry pyridine and 6.0 g. of a styrene-maleic anhydride (1:1 mol ratio) interpolymer were added. The reaction mixture was then heated at 100° C. for 18 hours and the polymer resin recovered as described in Example 3 above. After drying, a yield of 6.7 g. of resin dye was obtained.

Example 14

2.0 g. of the dye represented by the formula in Example 10 above were suspended in 200 cc. of dry pyridine and 6.0 g. of a finely divided styrene-maleic anhydride (1:1 mol ratio) interpolymer were added. The reaction mixture was then refluxed for 18 hours, and the resinous product processed as described in Example 3 above. There were thus obtained 6.5 g. of dry resin dye.

Example 15

2.0 g. of the dye represented by the following formula:

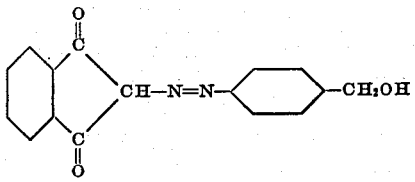

were suspended in 200 cc. of dry pyridine and 6.0 g. of fine-mesh polymethacrylic anhydride were added. The reaction mixture was then refluxed for 18 hours and the resinous product processed as described in Example 3 above. There were thus obtained 4.0 g. of resin dye after drying.

Example 16

2.0 g. of the dye represented by the formula in Example 15 above were suspended in 200 cc. of dry pyridine and 6.0 g. of fine-mesh polymethacrylic anhydride were added. The reaction mixture was then refluxed for 18 hours and processed as described in Example 3 above, except that the resinous product was precipitated in about one to one and a half liters of Skellysolve (consisting essentially of low-boiling hydrocarbons) instead of ether as described in Example 3.

Example 17

2.0 g. of the dye represented by the following formula:

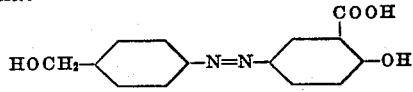

were suspended in 200 cc. of dry pyridine and 6.0 g. of fine-mesh polymethacrylic anhydride were added. The reaction mixture was then refluxed for 18 hours and processed according to the method described in Example 3 above. There was thus obtained a resin dye which caused no loss of sensitivity by diffusion when incorporated in a filter layer under an orthochromatic emulsion.

Example 18

6.0 g. of the dye represented by the formula in Example 10 above were suspended in 600 cc. of dry pyridine and 18.0 g. of a styrene-maleic anhydride (1:1 mol ratio) interpolymer, which had been ground to a fine-mesh particle size, were added. The reaction mixture was then refluxed for 18 hours and processed in the same manner as the reaction mixture in Example 3 above. After drying the resinous product in a vacuum, there was obtained a yield of 20 g. of non-diffusible resin dye.

Example 19

1.0 g. of the dye represented by the formula in Example 15 above were suspended in 50 cc. of dry pyridine and 3.0 g. of polymethacrylic anhydride, which had been ground to a fine-mesh particle size, were added. The reaction mixture was then refluxed for 18 hours and processed according to the method described in Example 3 above. After drying, there were obtained 2.3 g. of resin dye.

Example 20

2.0 g. of the dye represented by the following formula:

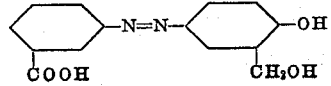

were suspended in 200 cc. of dry pyridine and 6.0 g. of fine-mesh polymethacrylic anhydride were added. The reaction mixture was then refluxed for 18 hours and processed according to the method described in Example 3 above. After drying the resinous product in a vacuum, there were obtained 5.3 g. of resin dye.

*Example 21*

1.0 g. of the dye represented by the formula in Example 15 above were suspended in 25 cc. of dry pyridine and 3.0 g. of fine-mesh polymethacrylic anhydride were added. The reaction mixture was then refluxed for 18 hours and processed according to the method described in Example 3 above. After drying there were obtained 2.6 g. of resin dye.

*Example 22*

2.0 g. of the dye represented by the following formula:

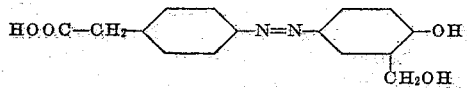

were suspended in 200 cc. of dry pyridine and 6.0 g. of fine-mesh polymethacrylic anhydride were added. The reaction mixture was then refluxed for 18 hours and processed according to the method described in Example 3 above. After drying there were obtained 5.5 g. of resin dye which could be easily bleached by a hydrosulfite bleach.

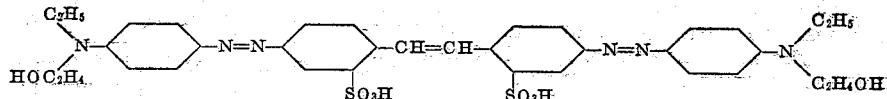

*Example 23*

1.0 g. of the dye represented by the formula in Example 15 above were suspended in 25 cc. of dry pyridine and 3.0 g. of fine-mesh polyacrylic anhydride were added. The reaction mixture was then refluxed for 18 hours and processed according to the method described in Example 3 above. After drying, there were obtained 2.6 g. of resin dye.

*Example 24*

2.0 g. of the dye represented by the following formula:

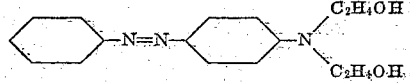

were suspended in 200 cc. of dry pyridine and 6.0 g. of fine-mesh polymethacrylic anhydride were added. The reaction mixture was then heated at 100° C. for 18 hours, and processed according to the method described in Example 3 above. After drying, there were obtained 4.1 g. of resin dye which was easily bleached by a hydrosulfite bleach.

*Example 25*

7.5 g. of the dye represented by the formula in Example 15 above were suspended in 187.5 cc. of dry pyridine and 22.5 g. of fine-mesh polymethacrylic anhydride were added. The reaction mixture was then refluxed for 18 hours and processed according to the method described in Example 3 above. After drying there were obtained 20.3 g. of resin dye.

*Example 26*

0.5 g. of the dye represented by the following formula:

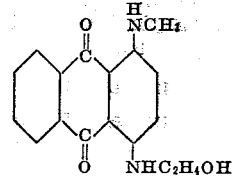

were suspended in 50 cc. of dry pyridine and 2.0 g. of fine-mesh polymethacrylic anhydride were added. The reaction mixture was then heated at 100° C. for 18 hours and processed according to the method described in Example 3 above. After drying, there were obtained 1.5 g. of resin dye showing little loss by diffusion when incorporated in a gelatin emulsion.

*Example 27*

1.0 g. of the dye represented by the formula in Example 24 above were suspended in 25 cc. of dry pyridine and 3.0 g. of polymethacrylic anhydride were added. The reaction mixture was then refluxed for 18 hours and processed according to the method described in Example 3 above. After drying there were obtained 2.6 g. of resin dye, which was easily bleached by hydrosulfite bleach.

*Example 28*

1.0 g. of the dye represented by the following formula:

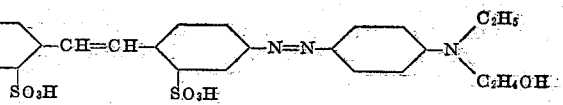

were suspended in 50 cc. of dry pyridine and 3.0 g. of fine-mesh polymethacrylic anhydride were added. The reaction mixture was then refluxed for 18 hours and processed according to the method described in Example 3 above. After drying there were obtained 3.2 g. of resin dye which was rapidly bleached by hydrosulfite bleach.

*Example 29*

In a 50 cc. reaction flask, equipped with a mechanically-driven stirrer and a reflux condenser, were placed 25 cc. of pyridine, 3 g. of polyacrylic anhydride and 1.0 g. of the triphenylmethane dye prepared in Example D above. The reaction mixture was refluxed on a Glascol heater for 30 minutes, cooled and diluted with an equal volume of acetone. The resin-dye was precipitated by pouring the solution into 1 liter of ether with stirring. The precipitate was then extracted with several changes of ether and dried in a vacuum desiccator. The yield of dried dye was 3.3 g. This resin-dye, after washing to remove unreacted dye, gave solutions equivalent in tinctorial strength to 14 per cent of those of the original dye, and was found to be completely non-diffusing. The bleaching of the resin-dye in sulfite solutions was rapid and complete.

Operating in a manner similar to that described in the above examples, other anthraquinone, triphenylmethane, azo, indigoid, acridine, benzanthrone, phenanthrene, quinhydrone, thioindigoid, phthalein, etc. dyes containing hydroxyalkyl groups can be reacted with the reactive polymers used above, or other synthetic polymers containing carboxylic halide or anhydride groups. During the washing steps which are preliminary to the addition of the resin dyes to filter layers those dyes containing unreacted carboxylic halide groups undergo hydrolysis to the extent of converting the carboxylic halide groups to free-carboxylic acid groups, while this is not necessarily true of the resin dyes containing carboxylic anhydride groups. These latter dyes can be converted to their more easily dispersible forms, i. e. free-carboxylic acid form, by the method described in Example 4 above. These dyes can also be converted to their alkali metal or amine salt forms by the method described in Example 1 above and incorporated in the washed emulsion in this form. Typical alkaline materials useful for this purpose include the alkali metal hydroxides (e. g. sodium, potassium, etc. hydroxides), alkali metal carbonates (e. g. sodium carbonate), alkylamines (e. g. ethylamine, diethylamine, diethanolamine, etc.), piperidine, etc.

We have also observed that while it might be expected that azo dyes containing more than one hydroxyalkyl group would react with the resinous carboxylic acid halides or anhydrides to form a cross-linked resin dye, which would be completely insoluble, such was not the case. It would thus appear that only one of such hydroxyalkyl groups underwent any apparent reaction.

The polyacrylic anhydride used above was prepared as follows:

*Example 30*

133 g. of acrylic anhydride (B. P. 60°–66°/10–12 mm.) were heated on a steam bath in an all-glass reflux outfit, protected from moisture by a calcium chloride tube, in the presence of 0.4 g. of benzoyl peroxide in 655 cc. of dry 1,4-dioxane. Polymerization occurred very vigorously and after a total heating time of 20 minutes the polymer had separated as a white powder. The polymer was filtered onto a Buchner funnel, washed with fresh, dry 1,4-dioxane while on the funnel, and then dried in a vacuum dessiccator over calcium chloride under constant water pump vacuum.

The polymethacrylic anhydride used above was prepared as follows:

*Example 31*

200 g. of methacrylic anhydride (B. P. 87°–88° C./14 mm.) were dissolved in 1500 cc. of dry 1,4-dioxane, and 0.6 g. of benzoyl peroxide was added. The reaction mixture was then heated on a steam bath as described in Example 30 above. The polymerization was not vigorous. The reaction mixture became turbid after about 35 minutes of heating, and after one hour it had set to a gel. This was broken by shaking and the reaction mixture was heated for an additional hour. The mixture was then cooled, and the polymethacrylic anhydride recovered according to the method described in Example 30 above.

Other synthetic resins containing carboxylic halide or anhydride groups, which can advantageously be utilized in our invention, can be obtained as described in the patents mentioned above. The method of our invention is of wide applicability to dyes of various types, as has been pointed out above.

The resin dyes of our invention can be employed as the light absorbing means in an antihalation layer positioned between a photographic silver halide emulsion layer and the support for the emulsion layer. The resin dyes of our invention can also be employed as the light absorbing means in a filter layer coated on top of a single emulsion layer or positioned between two or more emulsion layers. The resin dyes can also be mixed with and made an integral part of an emulsion layer. The resin dyes can also be used as the light absorbing means in an overcoat for correcting color balance of photographic color film.

What we claim as our invention and desire secured by Letters Patent of the United States is:

1. A resin-dye of the azo dye series containing a hydroxyalkyl group selected from the group consisting of C-hydroxyalkyl and N-hydroxyalkyl groups located in at least one of the positions other than the position ortho to the azo group, the said hydroxyl group having been esterified by a synthetic polymer containing a group selected from the group consisting of carboxylic halide and carboxylic anhydride groups, said synthetic polymer being a polymer of a polymerizable, unsaturated compound containing a $CH_2=C<$ group.

2. A resin-dye of the azo dye series containing a hydroxyalkyl group selected from the group consisting of C-hydroxyalkyl and N-hydroxyalkyl groups located in at least one of the positions other than the position ortho to the azo group, the said hydroxyl group having been esterified by polyacrylic anhydride.

3. A resin-dye of the azo dye series containing a hydroxyalkyl group selected from the group consisting of C-hydroxyalkyl and N-hydroxyalkyl groups located in at least one of the positions other than the position ortho to the azo group, the said hydroxyl group having been esterified by polymethacrylic anhydride.

4. A resin-dye of the azo dye series containing a hydroxyalkyl group selected from the group consisting of C-hydroxyalkyl and N-hydroxyalkyl groups located in at least one of the positions other than the position ortho to the azo group, the said hydroxyl group having been esterified by polyacrylic chloride.

5. A resin-dye of the azo dye series containing a hydroxyalkyl group selected from the group consisting of C-hydroxyalkyl and N-hydroxyalkyl groups located in at least one of the positions other than the position ortho to the azo group, the said hydroxyl group having been esterified by styrene-maleic anhydride interpolymer.

6. A process for making a resin-dye comprising heating at a temperature of from 40° C. to the reflux temperature of the reaction mixture an azo dye containing a hydroxyalkyl group selected from the group consisting of C-hydroxyalkyl and N-hydroxyalkyl groups located in at least one of the positions other than the position ortho to the azo group, with a synthetic polymer containing a group selected from the group consisting of carboxylic halide and carboxylic anhydride groups, said synthetic polymer being a polymer of a polymerizable, unsaturated compound containing a $CH_2=C<$ group.

7. A process for making a resin-dye comprising heating at a temperature of from 40° C. to the reflux temperature of the reaction mixture an azo dye selected from those represented by the following general formula:

$$R-N=N-R_1$$ 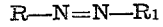

wherein R represents an aryl group and $R_1$ represents an aryl group having substituted thereon a N-hydroxyalkyl group in at least one position other than the position ortho to the azo group, with a synthetic polymer containing carboxylic anhydride groups, said synthetic polymer being a polymer of a polymerizable, unsaturated compound containing a $CH_2=C<$ group.

8. A process for making a resin-dye comprising heating at a temperature of from 40° C. to the reflux temperature of the reaction mixture an azo dye selected from those represented by the following general formula:

$$R—N=N—R_1$$

wherein R represents a monocyclic aryl group of the benzene series and $R_1$ represents a monocyclic aryl group of the benzene series having substituted thereon a N-hydroxyalkyl group in at least one position other than the position ortho to the azo group, with a synthetic polymer containing carboxylic anhydride groups, said synthetic polymer being a polymer of a polymerizable, unsaturated compound containing a $CH_2=C<$ group.

9. A process for making a resin-dye comprising heating at a temperature of from 40° C. to the reflux temperature of the reaction mixture an azo dye selected from those represented by the following general formula:

$$R—N=N—R_1$$

wherein R represents a monocyclic aryl group of the benzene series and $R_1$ represents a monocyclic aryl group of the benzene series having substituted thereon a N-hydroxyalkyl group in at least one position other than the position ortho to the azo group, with a polyacrylic anhydride.

10. A process for making a resin-dye comprising heating at a temperature of from 40° C. to the reflux temperature of the reaction mixture an azo dye selected from those represented by the following general formula:

$$R—N=N—R_1$$

wherein R represents a monocyclic aryl group of the benzene series and $R_1$ represents a monocyclic aryl group of the benzene series having substituted thereon a N-hydroxyalkyl group in at least one position other than the position ortho to the azo group, with a polyacrylic chloride.

11. A process for making a resin-dye comprising heating at a temperature of from 40° C. to the reflux temperature of the reaction mixture an azo dye selected from those represented by the following general formula:

$$R—N=N—R_1$$

wherein R represents an indandionyl group and $R_1$ represents a monocyclic aryl group of the benzene series having substituted thereon a C-hydroxyalkyl group in at least one position other than the position ortho to the azo group, with a synthetic polymer containing carboxylic anhydride groups, said synthetic polymer being a polymer of a polymerizable, unsaturated compound containing a $CH_2=C<$ group.

LOUIS M. MINSK.
JONAS JOHN CHECHAK.

REFERENCES CITED

The following references are of record in the file of this patent:

UNITED STATES PATENTS

| Number | Name | Date |
| --- | --- | --- |
| 1,984,417 | Mark | Dec. 18, 1934 |
| 2,050,588 | Schneider | Aug. 11, 1936 |
| 2,274,551 | Kenyon et al. | Feb. 24, 1942 |
| 2,304,890 | Dickey et al. | Dec. 15, 1942 |
| 2,350,090 | Beilenson | May 30, 1944 |
| 2,465,067 | Corner et al. | Mar. 22, 1949 |
| 2,472,215 | Ischer | June 7, 1949 |
| 2,473,403 | Woodward | June 14, 1949 |
| 2,477,462 | McQueen | July 26, 1949 |
| 2,520,339 | Robertson | Aug. 29, 1950 |